Patented Mar. 26, 1935

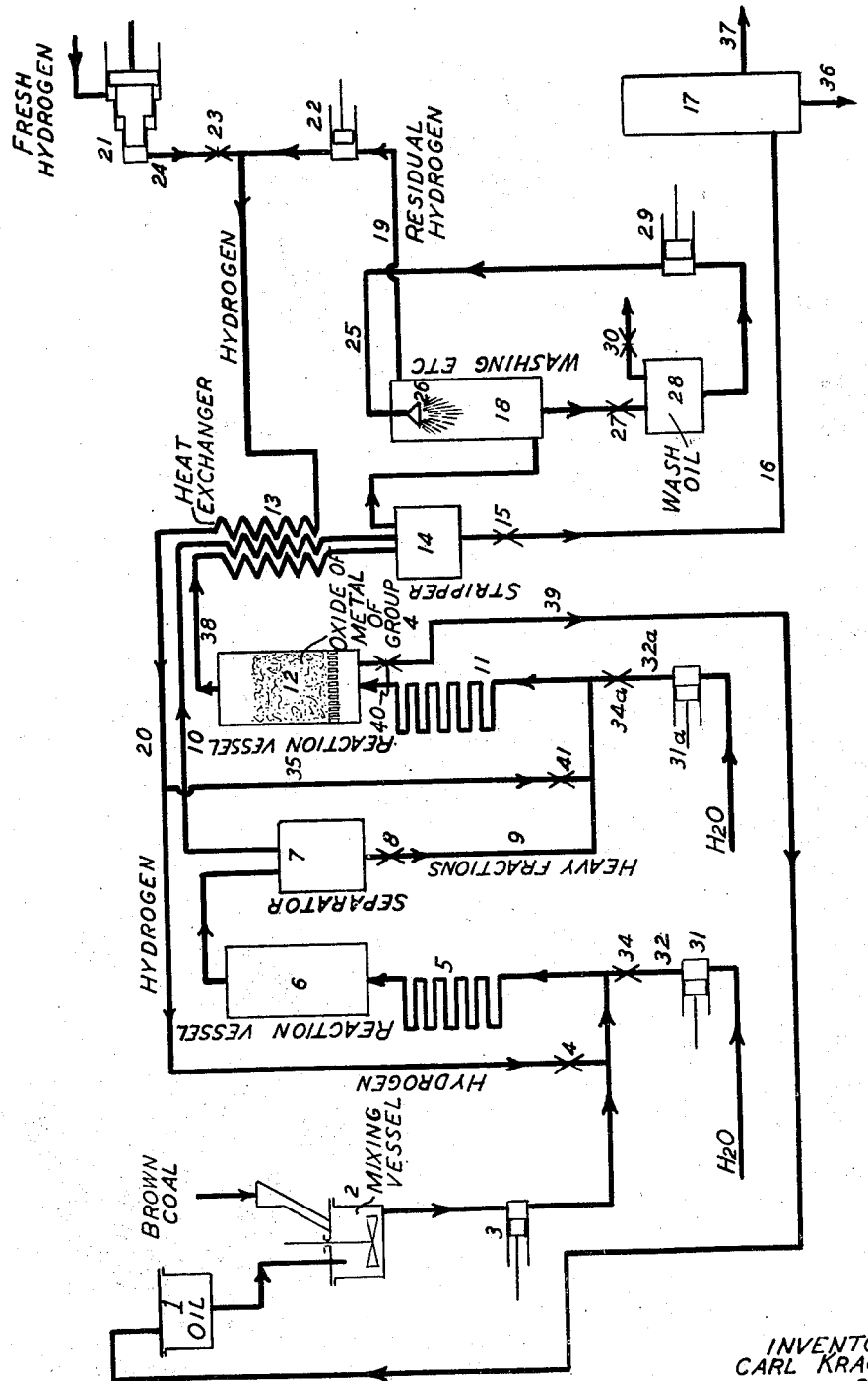

1,996,009

UNITED STATES PATENT OFFICE 1,996,009

CONVERSION OF SOLID FUELS AND PRODUCTS DERIVED THEREFROM OR OTHER MATERIALS INTO VALUABLE LIQUIDS

Carl Krauch, Ludwigshafen-on-the-Rhine, and Mathias Pier, Heidelberg, Germany, assignors to Standard-I. G. Company, Linden, N. J., a corporation of Delaware Application July 29, 1932, Serial No. 625,651
In Germany February 14, 1925

16 Claims. (Cl. 196—53)

Our invention relates to the destructive hydrogenation of carbonaceous materials and, in particular, to that process which is carried out in the presence of a catalyst immune to sulphur poisoning as generically described and claimed in our copending application Ser. No. 86,646, now U. S. Patent No. 1,890,434, of which this application is a continuation-in-part.

The object of our invention is to provide a catalyst which will act efficiently in the promotion of the conversion of carbonaceous substances into valuable liquid by destructive hydrogenation.

In our application Ser. No. 86,646 which contains claims generically covering the carrying out of the process in the presence of a catalyst immune to sulphur poisoning, it is stated that difficulty reducible oxides of the metals of the fourth group of the periodic system are suitable for use as catalysts immune to sulphur poisoning. It is the utilization of this group of materials as catalysts in the destructive hydrogenation process that is the subject matter of this application. Specifically the oxides of titanium, tin, cerium, lead, and thorium have been mentioned in the said application Ser. No. 86,646.

The oxides of the metals of the fourth group of the periodic system are the oxides of titanium, germanium, zirconium, tin, cerium, hafnium, lead, and thorium. We have found that these oxides are suitable for use in this process either singly or in combination with each other or in combination with other materials; such as, compounds of nitrogen; compounds containing combined sulphur, particularly sulphides of heavy metals; metals of the sixth group of the periodic system or compounds thereof; compounds of silver, copper, cadmium, lead, bismuth, and tin; lithium oxide or carbonate; magnesite; boric acid; alumina; rare earths; oxides and carbonates of zinc, manganese and vanadium; and difficultly reducible oxides of other metals.

The said catalysts may be added in any suitable manner. They may be added to the solid or liquid material, or in the case of liquids they may be placed in the reaction vessel and the liquids brought into contact with them in a vaporized or otherwise finely divided state. Other bodies, for example, lumps of brick, quartz, asbestos, coke, active carbon, silica gel, metals, especially heavy metals, or metal oxides, or carbides, or mixtures of such bodies, may also be present in the reaction chamber. The said bodies have the effect of avoiding the formation of carbon deposits and of facilitating the distribution of the hydrogenating gas.

As regards the materials to be treated, the invention can be applied to any sort of solid fuels, for example, hard or soft coal, brown coal, lignite, peat, wood, or similar materials, mineral oils, shale oils, or other solid or liquid bitumina, also distillation or extraction products of all of them, such as tars obtained therefrom, whether by ordinary destructive distillation or by low temperature carbonization, or brown coal bitumen, or tars or oils obtained by pressure hydrogenation of solid or liquid fuels, or components or conversion products of all the above mentioned materials, such as cracked products, coumarone or any other resins or residues of their distillation, pitch, asphaltum and so on, or mixtures of several such products with each other, also of solids with the above-named liquids or of one or more of such products with other suitable organic liquids.

Especially when employing coal or liquid fuels, an addition of lignite or peat is often of advantage, often increasing the hydrogenizing action, avoiding several drawbacks and in the case of solid substances rendering their introduction easier. All the said materials may be used in the presence of substantial amounts of water and, if desired, water may be added as such. Sometimes the process of hydrogenation is hereby furthered. For example lignite producer tar containing from 40 to 50 per cent of water may be used to advantage directly.

The preferred form of carrying out the process is generally a continuous operation with a stream of the gases and with an excess thereof over the required quantity and preferably while maintaining the desired pressure by adding fresh gas and passing the gas either by circulation through one or more reaction vessels or through a succession of several reaction vessels. The material to be converted is supplied at a proper place and the products are separated from the reaction gases by cooling.

We further discovered that the process according to the present invention is in many cases, and in particular when converting solid fuels or heavy oils or residues, greatly improved by carrying out the process in two parts or stages. In the first stage the coal, tars or heavy petroleum products are converted into liquids poor in fractions of low boiling point by liquefication or destructive hydrogenation with or without catalysts, while in the second stage the products of stage one are transformed into hydrocarbons of low boiling point, by destructive hydrogenation, but preferably with the aid of catalysts. Increased pressure is preferably employed in one or both stages. Insofar as catalytic masses are added in both stages, they may be of the same kind or different in quantity, concentration, or kind. The two stages can be effected in two separate or adjoining reaction vessels or in different parts of a single vessel constructed in a suitable manner. Even more than two stages may be employed successively in certain cases.

The gases serving for the reaction may consist of hydrogen alone or of mixtures containing hydrogen, for example a mixture of hydrogen with nitrogen, or water gas, or hydrogen mixed with carbon dioxide, hydrogen sulphide, water vapor or methane or other hydrocarbons. Or the hydrogen may be generated in the reaction chamber by the interaction of water and carbon monoxide, and by similar reactions. When employing nitrogen compounds as catalysts, and carbon monoxide and water, the gas must be employed in a stream.

The process is best carried out under elevated or even strongly elevated pressure and most suitably with a stream of the gas passed through or over the material to be treated or carrying it along through the reaction vessel by which method the production obtained by the process is very large.

Depending on the conditions of working, for example temperature and pressure employed or duration of the treatment, the products are poor or rich in products of low boiling point. Generally the temperature ranges between 300° and 700° C., and the pressure when used, should amount to at least 20 atmospheres and should preferably be much higher up to about 2000 atmospheres.

In the following examples the time of reaction varies considerably, as might be supposed, depending on the nature of the raw material, the activity of the catalyst, temperature, pressure and the like. In practice it is desirable to make a few preliminary runs in order to determine the time required for the best yields under a given set of conditions. Generally speaking, with batch operations the total time may be from two to ten hours or more, depending on the yield desired, while with continuous operations the time is usually shorter. When continually feeding liquid or difficulty vaporizable oils, the rate of flow may be in the neighborhood of .3 to .8 volume of oil per hour per volume of reaction space. Vaporous materials may be treated at higher temperatures and the feed rate may consequently be one or even one and one-half volumes per hour per volume of reaction space. The volume of hydrogen may likewise vary considerably and should always, of course, be in excess of that actually required for the conversion; for example, the rate of flow of hydrogen may be in excess of about 600 liters per kilogram of carbonaceous material.

The practical method of carrying out our process is best illustrated by reference to the accompanying drawing which illustrates in skeleton form the apparatus employed for operation in two stages and which bears suitable legends for describing the process. For operation in a single stage a similar apparatus is used except that one reaction vessel is employed.

Finely ground brown coal is made into a paste in the mixing vessel 2 with oil from tank 1 and is thereafter forced by means of pump 3 together with hydrogen, which is supplied from conduit 20, through the pre-heater 5 into the reaction vessel 6. The regulation of the amount of hydrogen necessary for the conversion is effected by means of valve 4. The separation of the solid and fluid and gaseous and vaporous portions of the product leaving reaction vessel 6 takes place in the separator 7. The gaseous and vaporous portions of the product leave the vessel 7 through pipe 10, pass through heat exchanger 13 wherein they impart their heat to incoming hydrogen and then enter stripper 14 where the normally fluid products are separated and conducted through pipe 16 controlled by valve 15 into storage tank 17. The normally gaseous products containing hydrogen are conducted to the washing tower 18 where the hydrocarbons are washed out by means of the wash oil which is circulated through the washing tower 18 where it is sprayed by nozzle 26. The purified hydrogen leaves tower 18 by pipe 19 and is pumped by pump 22 back into conduit 20 for further use in the process. The normally gaseous hydrocarbons removed by the wash oil leave tank 28 through pipe 30. The heavier liquid and solid hydrocarbons resulting from the reaction in vessel 6 are drawn off from separator 7 through a pipe 9 carrying a valve 8. Hydrogen is supplied to pipe 9 through pipe 31 from conduit 20 and the amount of hydrogen required is controlled by valve 41 in pipe 35. The mixed heavy materials and hydrogen pass through the preheater 11 into reaction vessel 12 which is filled with an oxide of a metal of group 4 of the periodic system. The gaseous and vaporous products of the reaction in vessel 12 pass off through pipe 38 through heat exchanger 13 into the stripper 14 from which point they pass through the same series of operations as the products leaving vessel 7 through pipe 10 as described above. The residual oily and solid materials left in vessel 12 can be drawn off through pipe 39 by release of the valve 40 and returned to the initial oil tank 1.

In the event that a catalyst is used in the first stage, it is preferably mixed in a finely divided state with the initial materials in vessel 2, but it can be employed in the same manner in which it is employed in vessel 12.

In case the conversion is to be made in the presence of water vapor, water is introduced by means of pumps 31 and 31a, respectively, into reaction vessels 6 and 12, respectively. The regulation of the necessary amount of water is effected by means of valves 34 and 34a, respectively. The water evaporates in the pre-heaters 5 and 11, is condensed in the heat exchanger 13 and collected at the bottom of tank 17. From there it may be drawn off through conduit 36, whereas the benzine is removed through a pipe 37 positioned at a higher level in the tank.

The following examples will serve to further explain how our invention is carried out in practice, but we do not restrict our invention to these examples.

*Example 1*

Petroleum residues are passed along with a current of hydrogen over titanium oxide under a pressure of 50 atmospheres and at a temperature of about 500° to 550° C. whereby it is rapidly and completely converted in a continuous manner, without any formation of coke or asphalt, into a product containing from about 50 to 80 per cent of benzine boiling up to 150° C.

*Example 2*

Lignite, whether alone or mixed with mineral or tar oil is continuously fed into a high pressure reaction vessel in which it is exposed to the action of a current of hydrogen in excess of the consumed quantity under a pressure of 200 atmospheres and a temperature of about 480° C., if desired in the presence of stannous or stannic oxide, while the solid or pasted material is slowly moved forward through the reaction vessel. The hot gas current containing the products formed by the interaction with hydrogen is passed into a second reaction vessel also capable of withstanding the pressure, which latter is maintained and which vessel is supplied with precipitated litharge in lumps and heated to from 500° to 550° C. whereupon the gases are cooled after having transferred heat to the gas entering the first vessel; a mobile oil collects in the cool receiver containing about 50 per cent of benzine of low boiling point. The gas is freed from gaseous hydrocarbons which are present in a small amount and is then passed with an addition of fresh hydrogen to make up for the consumed amount thereof, by means of a circulating pump, successively through the first and second vessel and the cooler and so forth. The solid residue, chiefly ashes, left by the treatment of the brown coal is suitably withdrawn between the first and second vessel. By this treatment 70 or more per cent of the carbon content of the lignite is easily and quickly converted in a continuous manner into valuable hydrocarbons.

A catalyst of the character described above may also be employed in the first stage, and in the second stage the litharge may be replaced by other such catalysts and those of a more precious character are preferably employed in the second stage where there are no ashes or other solid residues.

*Example 3*

Dark colored residues of an American rock oil which at ordinary temperature are nearly solid and have a strongly unsaturated character are incorporated with an excess of a gas mixture composed of three parts, by volume, of hydrogen and 1 part of nitrogen and continuously passed under a pressure of 200 atmospheres and a temperature of from 450° to 500° C. over a catalyst prepared from an intimate mixture of 70 parts, by weight, of ammonium molybdate and 30 parts of zirconium oxide. A nearly colorless, mobile and saturated product is obtained besides a little methane, consisting of 90 per cent of colorless petrol boiling up to 150° C. and 10 per cent of a thin, yellowish product of a higher boiling point.

*Example 4*

Jura shale oil of 0.950 sp. gr. containing 4 per cent of sulphur which on distilling yields 6 per cent petrol up to 150° C. and 21 per cent of a pitch-like residue over 350° C. is treated as described in the foregoing example. The product is a mobile yellowish oil of 0.810 sp. gr. containing 80 per cent of saturated petrol boiling up to 150° and leaving at 200° C. a liquid only slightly colored residue.

*Example 5*

Mexican asphaltum is dissolved in its own weight of cyclohexane and treated in the aforedescribed manner. The cyclohexane is recovered unaltered, while the asphaltum which before the treatment contained 4 per cent compounds boiling up to 250° C., 25 per cent more boiling up to 350° C., and 70 per cent of a hard pitch residue is converted into a mobile oil, free from oxygen compounds and chiefly consisting of petrol hydrocarbons besides a very small vaseline-like residue.

Rock oils of any origin may be treated as described in the above examples and thereby converted into refined products of much more valuable properties.

*Example 6*

Dark-colored residues of an American rock oil which at ordinary temperature are nearly solid and have a strongly unsaturated character, are incorporated with hydrogen and passed continuously under a pressure of 200 atmospheres and at from 450° to 500° C. over a catalyst prepared by forming thoria into lumps. A light-colored, thin liquid is produced besides a little methane which on distillation yields 50 per cent of a fraction up to 150° C. and additional 35 per cent up to 350° C., all of a saturated character. The small residues are thick or vaseline-like and free from pitch.

*Example 7*

Cresylic acid obtained from coal tar is continuously passed along with a mixture of hydrogen and nitrogen at about 450° C. and under a pressure of about 150 atmospheres over a catalyst containing the oxides of silver and titanium. The phenolic bodies are hereby completely reduced to hydrocarbons. Catalysts comprising lithium carbonate, magnesite, manganese oxide, silver borate, or copper and cerium oxide, or silver and cobalt oxide can be used similarly.

*Example 8*

Brown coal producer tar is continuously passed together with a current of hydrogen, under a pressure of 800 atmospheres and at a temperature of about 500° C. over a catalyst consisting of porous material coated with thoria. The product obtained consists of up to 50 per cent of gasoline.

*Example 9*

Steamer fuel oil, produced from American oil, is passed in a continuous manner, together with a mixture of hydrogen and nitrogen, at about 500° C. and under a pressure of 200 atmospheres over a catalyst prepared by impregnating porous material with lead nitrate and calcining. The gas is circulated while maintaining the pressure and making up for the consumed hydrogen by fresh gas. A light-colored product of 0.85 sp. gr. is produced, the lower fractions of which may directly serve as a fuel for internal combustion engines, while the higher fractions are a highgrade starting material for preparing lubricating oil.

Instead of lead nitrate, stannous chloride alone or in mixture with silver nitrate, cupric hydroxide or compounds of iron, cobalt and others, may also be used, and other materials such as tars, coal etc. may be treated in a similar way.

Our invention is not confined to the above examples; the conditions may be widely varied in various directions. For example the pressures and temperatures may be higher or lower than stated above.

In the appended claims, the expression "distillation and extraction products thereof" is intended to relate only to solid and liquid distillation and extraction products and is not to be construed to include normally gaseous products of the distillation of solid and liquid fuels.

What we claim is:

1. The process of destructively hydrogenizing carbonaceous substances, such as solid and liquid fuels, distillation and extraction products thereof which comprises treating them with hydrogen in the presence of an oxide of a metal of the fourth group of the periodic system, and heat at a temperature between 300° and 700° C. sufficient to promote the reaction and at a pressure of at least 20 atmospheres.

2. The process of destructively hydrogenizing carbonaceous substances, such as solid and liquid fuels, distillation and extraction products thereof, which comprises treating them with hydrogen in the presence of an oxide of a metal of the fourth group of the periodic system and heat at a temperature between 300° and 700° C. sufficient to promote the conversion and at a pressure of at least 20 atmospheres, the conditions of working such as temperature, pressure and the efficiency of the catalyst, being so adapted to each other, as to give rise to the formation of substantial amounts of low boiling hydrocarbons of a benzine character.

3. The process of destructively hydrogenizing carbonaceous substances, such as solid and liquid fuels, distillation and extraction products thereof, into valuable liquids, which comprises treating them with a stream of hydrogen in the presence of an oxide of a metal of the fourth group of the periodic system, and heat at a temperature between 300° and 700° C. sufficient to promote the conversion and at a pressure of at least 20 atmospheres.

4. The process of destructively hydrogenizing carbonaceous substances, such as solid and liquid fuels, distillation and extraction products thereof which comprises treating them with hydrogen, in the presence of an oxide of a metal of the fourth group of the periodic system and of a substantial amount of water, and heat at a temperature between 300° and 700° C. sufficient to promote the reaction and at a pressure of at least 20 atmospheres.

5. The process of converting carbonaceous substances, such as solid and liquid fuels, distillation and extraction products thereof, into valuable liquids which comprises treating them with hydrogen, in the presence of an oxide of a metal of the fourth group of the periodic system, and heat at a temperature of between about 300° and 700° C. and at a pressure of at least 50 atmospheres.

6. The process of converting carbonaceous substances such as solid and liquid fuels, distillation and extraction products thereof, into valuable liquids which comprises continuously feeding said substances with hydrogen into a reaction space containing an oxide of a metal of the fourth group of the periodic system and held at a temperature of between about 300° and 700° C. while maintaining a pressure of at least 20 atmospheres in said space and continuously removing resulting products.

7. The process of producing liquids from solid fuel materials which comprises destructively hydrogenating the initial material, in the presence of an oxide of a metal of the fourth group of the periodic system, at a pressure of at least 20 atmospheres and at a temperature of between about 300° and 700° C.

8. The process of producing liquid hydrocarbons from lignite which comprises destructively hydrogenating the initial material in the presence of an oxide of a metal of the fourth group of the periodic system, at a pressure of at least 20 atmospheres and at a temperature of between about 300° and 700° C.

9. The process of converting carbonaceous substances, such as solid and liquid fuels, distillation and extraction products thereof, into valuable liquids which comprises treating them with a continuous stream of hydrogen and a substantial amount of water and heat at a temperature of between about 300° and 700° C. and at a pressure of at least 50 atmospheres in the presence of an oxide of a metal of the fourth group of the periodic system.

10. The process of converting carbonaceous substances, such as solid and liquid fuels, distillation and extraction products thereof, into valuable liquids which comprises treating a mixture of one of said substances with another of said substances of more recent geological age than the first by destructive hydrogenation in the presence of an oxide of a metal of the fourth group of the periodic system, under a pressure of at least 20 atmospheres and at a temperature of between about 300° and 700° C.

11. The process of destructively-hydrogenizing carbonaceous substances, such as solid and liquid fuels, distillation and extraction products thereof, into valuable liquids which comprises first treating them with hydrogen at a pressure of at least 20 atmospheres and with heat at a temperature between 300° and 700° C. sufficient to promote the conversion until products poor in fractions of low boiling point are obtained and then in a further stage converting the heavier fractions of such products alone into products rich in fractions of low boiling point by a further treatment with hydrogen at a pressure of at least 20 atmospheres and heat at a temperature between 300° and 700° C. sufficient to promote the conversion, in the presence of an oxide of a metal of the fourth group of the periodic system.

12. The process of destructively hydrogenizing carbonaceous substances, such as solid and liquid fuels, distillation and extraction products thereof, into valuable liquids which comprises first treating them with a current of hydrogen at a pressure of at least 50 atmospheres and with heat at a temperature between 300° and 700° C. sufficient to promote the conversion until products poor in fractions of low boiling point are obtained, and then in a further stage converting the heavier fractions of such products alone into products rich in fractions of low boiling point by a further treatment with hydrogen at a pressure of at least 50 atmospheres and heat at a temperature between 300° and 700° C. sufficient to promote the conversion in the presence of an oxide of a metal of the fourth group of the periodic system.

13. The process of destructively hydrogenizing carbonaceous substances, such as solid and liquid fuels, distillation and extraction products thereof, into valuable liquids which comprises treating them with hydrogen in the presence of an oxide of a metal of the fourth group of the periodic system, at a temperature between 300° and 700° C. sufficiently high for the conversion and at a pressure of at least 20 atmospheres for a period such that, under the conditions as above given, the product is substantially free from asphalt.

14. The process of destructively hydrogenizing carbonaceous substances, such as solid and liquid fuels, distillation and extraction products thereof, containing asphaltic hydrocarbons, into valuable liquids which comprises treating them with hydrogen in the presence of an oxide of a metal of the fourth group of the periodic system, at a temperature between 300° and 700° C. sufficiently high for the conversion and at a pressure of at least 20 atmospheres for a period such that, under the conditions as above given, the product is substantially free from asphalt.

15. The process of destructively hydrogenizing carbonaceous substances such as solid and liquid fuels, distillation and extraction products thereof, into valuable liquids which comprises treating them with a stream of hydrogen in the presence of an oxide of a metal of the fourth group of the periodic system, and heat at a temperature between 300° and 700° C. sufficiently high for the conversion and at a pressure of at least 20 atmospheres and carrying off resulting products in the stream of hydrogen.

16. The process of destructively hydrogenizing carbonaceous substances, such as solid and liquid fuels, distillation and extraction products thereof, into valuable liquids which comprises treating them with added hydrogen in the presence of added thoria, and heat at a temperature between 300° and 700° C. sufficient to promote the conversion and at a pressure of at least 50 atmospheres.

CARL KRAUCH.
MATHIAS PIER.